United States Patent [19]

Powers

[11] Patent Number: 4,900,408

[45] Date of Patent: Feb. 13, 1990

[54] MEMBRANE ELECTROLYTIC PROCESS FOR PRODUCING CONCENTRATED CAUSTIC

[75] Inventor: Johnny D. Powers, Fayetteville, N.C.

[73] Assignee: E. I. Du Pont de Nemours & Co., Wilmington, Del.

[21] Appl. No.: 355,448

[22] Filed: May 17, 1989

Related U.S. Application Data

[63] Continuation-in-part of Ser. No. 151,303, Feb. 1, 1988, abandoned.

[51] Int. Cl.$^4$ ............ C25B 1/16; C25B 13/08
[52] U.S. Cl. ................................. 204/98; 204/282; 204/283; 204/296
[58] Field of Search ............. 204/98, 128, 296, 282, 204/283; 521/27

[56] References Cited

U.S. PATENT DOCUMENTS

| | | | |
|---|---|---|---|
| 4,025,405 | 5/1977 | Dotson et al. | 204/98 |
| 4,202,743 | 5/1980 | Oda et al. | 204/98 |
| 4,508,603 | 4/1985 | Ukihashi et al. | 204/296 |

FOREIGN PATENT DOCUMENTS

| | | | |
|---|---|---|---|
| 0063737 | 6/1975 | Australia | 204/98 |
| 0119080 | 9/1984 | European Pat. Off. | 204/98 |
| 55-158283 | 12/1980 | Japan . | |
| 59-98566 | 12/1985 | Japan . | |
| 1206341 | 1/1986 | U.S.S.R. | 204/98 |

OTHER PUBLICATIONS

"Operational Technology with 'Flemion' for Chlor-Alkali Electrolysis", Sato et al.
"Flemion Perfluorocarboxylate Membranes", Ukihashi et al. ACS Symposium Series 180 Perflourinated Ionomer Membranes, Feb. 23–26, 1982.

*Primary Examiner*—John F. Niebling
*Assistant Examiner*—Kathryn Gorgos
*Attorney, Agent, or Firm*—Paul R. Steyermark

[57] ABSTRACT

Process for the manufacture of sodium hydroxide in a sustained manner, tolerant of upsets in sodium hydroxide concentration, by electrolysis of sodium chloride at about 70°–110° C. in an electrolysis cell separated into a cathode compartment and an anode compartment by a cation exchange membrane, wherein the membrane is made of a copolymer of tetrafluoroethylene with a perfluoro monomer Z having a defined structure and a carboxyl end group, the mole ratio of tetrafluoroethylene to the monomer Z in the copolymer being about 7.6 to 8.2, the membrane material on the side exposed to the catholyte being nonporous but having a porous catholyte diffusion layer in direct contact therewith or in close proximity thereof. The sodium chloride feed solution is about equal to the concentration of saturated brine at the operating temperature, and the concentration of sodium chloride solution leaving the anode compartment is about 18–24%, no water being added to the catholyte during steady state operation. In this manner, 42–54% sodium hydroxide can be made with current efficiencies of about 90–97%.

15 Claims, 8 Drawing Sheets

MEMBRANE ELECTROLYTIC PROCESS FOR PRODUCING CONCENTRATED CAUSTIC

CROSS-REFERENCE TO RELATED APPLICATION

This is a continuation-in-part of my copending application Ser. No. 07/151,303, filed Feb. 1, 1988 now abandoned.

BACKGROUND OF THE INVENTION

This invention relates to an electrolytic process for the production of concentrated sodium hydroxide from a concentrated sodium chloride solution in an electrolytic cell in which the anolyte and the catholyte are separated from each other by a membrane.

It is known to make aqueous sodium hydroxide solutions (often referred to in the industry as caustic) by the electrolysis of brine (i.e., aqueous sodium chloride) in an electrolytic cell having an anode and a cathode, in which the anolyte and catholyte are separated by a hydraulically impermeable cationic membrane. Depending on the electrolysis conditions, the resulting sodium hydroxide solutions may have concentrations of about 20–55 weight percent NaOH, and the current efficiencies may vary from as low as about 60% to as high as about 97%, lower concentration sodium hydroxide solutions being usually obtained at higher current efficiencies. Since commercial caustic normally has a 50% NaOH concentration, more dilute solutions naturally must be further concentrated to that level, using either steam or some other source of energy. Caustic of at least about 45 weight % NaOH made in the electrolysis process can be directly concentrated to 50 % caustic using its own sensible heat. Accordingly, it would be desirable to be able to make aqueous sodium hydroxide solutions having high NaOH concentrations by brine electrolysis at a high current efficiency, especially solutions of at least 45% NaOH concentration, which can be concentrated to 50% NaOH commercial product without further expenditure of energy.

In addition to the basic requirement that concentrated caustic be made at a high current efficiency, it is important for the practical operation of such a process that this high current efficiency be maintained for an extended period. Thus, although various literature reports and patents suggest that high concentrations of caustic have been obtained at a fairly high current efficiency, very scant information is provided on the stability of the process over extended periods, and there is reason to believe that many of those processes would not maintain their efficiencies for months of continuous operation.

While considerable effort has been expended in this area and still is continuing worldwide, representative art includes th following:

U.S. Pat. No. 4,025,405 (Dotson et al., Diamond Shamrock), which describes brine electrolysis with a membrane having all sulfonyl groups, wherein it is reported that caustic of up to 55% NaOH was made without water addition in steady state operation. The examples, however, show that the current efficiency never exceeded 89.5% at a caustic concentration of 42% NaOH.

Japanese Laid Open Patent Application 55/158283 (Asahi Glass), which discloses a process using an all carboxyl group membrane with an equivalent weight of 690. An example describes the production of 55% caustic at a current efficiency of 88%.

Japanese Laid Open Patent Application 60/243292 (Asahi Glass) reports the production of 45% caustic at a 90–91.5% current efficiency using sulfonyl membranes. This application explicitly notes the instability of carboxylic acid groups when exposed long-term at high temperatures to caustic soda of a high concentration.

U.S. Pat. No. 4,202,743 (Oda et al., Asahi Glass) describes the production of 40% caustic with a carboxyl membrane having an equivalent weight of 667 at an initial current efficiency of 97% (after 10 days on line), which decreased to 93% at 360 days on line.

U.S. Pat. No. 4,135,996 (Buoy et al., Rhone-Poulenc) describes brine electrolysis with a nonporous perfluorosulfonate membrane, wherein a microporous layer such as asbestos or polytetrafluoroethylene was placed next to the cathode. Caustic of 44% NaOH concentration was made at a current efficiency of 60–61%.

U.S. Pat. No. 4,212,713 (Suhara, Asahi Glass) teaches that more dilute caustic can be made with a carboxyl membrane of higher equivalent weight (i.e., lower ion exchange capacity). However, it also notes that carboxylic acid groups of the membrane are remarkably unstable and are gradually decomposed in an alkali metal hydroxide solution at a concentration higher than 40 wt. % at a temperature higher than 80° C.

Finally, a paper entitled "Operational Technology with "Flemion" For Chlor-Alkali Electrolysis" by K. Sato of Asahi Glass Co. at the May, 1986, meeting of the Electrochemical Society in Boston shows the inability of the state of the art membranes to make concentrated caustic. A specific membrane described in that paper could not tolerate operation at 45% caustic concentration for even a few hours, while operation at a 38% caustic concentration for two months at 70° C. caused irreparable damage to the membrane.

As can be seen from the above discussion of some representative patent and technical literature, there still is no concensus of opinion as to satisfactory process conditions for producing high concentration caustic by electrolysis of brine in an electrolytic cell in which the anolyte and the catholyte are separated by a water-impermeable membrane.

SUMMARY OF THE INVENTION

According to the present invention, there is now provided in a process for the manufacture of sodium hydroxide by electrolysis at a temperature of about 70° to 110° C. of an aqueous solution of sodium chloride in an electrolysis cell comprising an anode compartment and a cathode compartment separated from each other by a cation exchange membrane, wherein a more concentrated sodium chloride solution is continuously introduced into the anode compartment; a less concentrated sodium chloride solution is continuously withdrawn from the anode compartment; and the resulting sodium hydroxide solution is continuously recovered from the cathode compartment, the improvement of operating the process in a sustained manner, tolerant of upsets in sodium hydroxide concentration, by using as the cation exchange membrane a membrane consisting of at least one layer, in which the material of at least the layer closest to the cathode is a copolymer of tetrafluoroethylene with a monomer Z of the general formula wherein n is 0, 1, or 2; and Y=F or $CF_3$; and the mole ratio of tetrafluoroethylene to monomer Z in the resin is about 7.6 to 8.2, the membrane material on the side exposed to the catholyte being itself nonporous but having a porous catholyte diffusion layer in direct contact therewith or in close proximity thereof between the membrane and the cathode, the sodium chloride concentration in the feed solution being about equal to the concentration of saturated brine at the operating temperature, and the concentration of the sodium chloride solution leaving the anode compartment being about 18–24 weight percent, no water being added to the catholyte during steady state operation, except water passing through the membrane from the anode compartment to the cathode compartment, and recovering from the cathode compartment a catholyte in which the sodium hydroxide concentration is about 42–54 weight percent.

BRIEF DESCRIPTION OF THE DRAWINGS

FIGS. 1 and 2 represent the process of this invention.

All the curves in FIGS. 3–7 show the daily variations for operation up to a period of one year.

DETAILED DESCRIPTION OF THE INVENTION

The carboxylic polymers of which the membrane layer in contact with the catholyte is made have a fluorinated hydrocarbon backbone chain to which are attached side chains carrying certain functional groups hydrolyzable in the alkaline medium to carboxylate groups, such as nitrile or ester groups. Those polymers include, e.g., those containing the side chains, where Y is F or $CF_3$; n is 0, 1, or 2; and W is COOR or —CN, where R is lower alkyl. Such polymers are described in U.S. Pat. No. 4,138,426 (England, Du Pont). Among these polymers, those with n=1 and Y=$CF_3$ are preferred.

Preferably, the membrane used in the electrolytic cells according to the process of this invention consists of at least two layers, at least one layer in contact with the anolyte having pendant sulfonyl groups.

The sulfonyl polymers of which at least one membrane layer in contact with the anolyte according to this invention can be made are fluorinated polymers with side chains containing the group —$CF_2CFR'SO_2X$, wherein R' is F, Cl, $CF_2Cl$ or a $C_1$ to $C_{10}$ perfluoroalkyl radical, and X is F or Cl, preferably F. Ordinarily, the side chains will contain —$OCF_2CF_2CF_2SO_2X$ or —$OCF_2CF_2SO_2F$ groups, preferably the latter. The perfluorinated polymers are preferred.

Polymers containing the side chain where k is 0 or 1 and j is 3, 4, or 5, may be used. These are described in U.S. Pat. No. 4,329,435 (Kimoto et al., Asahi Glass).

Polymers containing the side chain —$CF_2CF_2SO_2X$ are described in U.S. Pat. No. 3,718,627 (Grot, Du Pont).

Preferred polymers contain the side chain —$(OCF_2CFY)_r$—$OCF_2CFR'SO_2X$, where R', Y, and X are as defined above; and r is 0, 1, 2, or 3. Some of those polymers are described in U.S. Pat. No. 3,282,875 (Connolly et al., Du Pont). Especially preferred are copolymers containing the side chain Polymerization can be carried out by the methods described in the above references. Especially useful is solution polymerization using 1,2,2-trichloro-2,1,1-trifluoroethane as the solvent and perfluoropropionyl peroxide as the initiator. Polymerization can also be carried out by aqueous granular polymerization.

The copolymers used in the manufacture of membrane layers used in the process of the present invention should be of high enough molecular weight to produce films which are self-supporting in both their melt-fabricable (precursor) form and in the hydrolyzed ion exchange form.

A membrane having at least one layer of a copolymer having sulfonyl groups in melt-fabricable form and a layer of a copolymer having carboxyl group in melt-fabricable form, such as made by coextrusion, can be used as one of the component films in making the membrane to be used in the process of the present invention. Such a laminated structure will be occasionally referred to herein as a bimembrane. Bimembranes are well known in the art.

It is in fact preferred to use in the present process a carboxyl/sulfonyl bimembrane, and it is possible for the sulfonyl layer to have an equivalent weight lower than that of the carboxyl layer by at least 50 units.

It is also possible to use an all-carboxyl membrane with a layer of lower equivalent weight on the anolyte side.

The membrane used in this invention may also comprise three layers:

(a) on the catholyte side, a carboxyl layer of a 5–50 micrometer thickness, preferably 20–40 micrometers, with an equivalent weight suitable to provide a water transport of 3.0–4.0 moles of water per gramatom of Na, (b) in the middle, an optional carboxyl layer with a lower equivalent weight and a thickness in the same range, as that of (a), and (c) on the anolyte side, a sulfonyl layer of a 50–250 micrometer thickness, preferably 75–100 micrometers.

Membranes usually have an overall thickness of 50–300 micrometers, especially 125–200 micrometers.

The customary way to specify the structural composition of films or membranes in this field is to specify the polymer composition, ion-exchange capacity or equivalent weight, and thickness of the polymer films in melt-fabricable form, from which the membrane is fabricated. This is done because the measured thickness varies depending on whether the membrane is dry or swollen with water or an electrolyte, and even on the ionic species and ionic strength of the electrolyte, even though the amount of polymer remains constant.

For the use in electrolysis of brine, the membrane should have all of the functional groups converted to ionizable functional groups. These will be sulfonic acid and carboxylic acid groups, or preferably sodium salts thereof. When the term "sulfonic ion exchange groups" or "sulfonyl" is used, it includes not only the sulfonic acid group but particularly the sodium salts thereof. Similarly, the term "carboxylic ion exchange groups" or "carboxyl" means the carboxylic acid group and particularly the sodium salts thereof.

Conversion to ionizable functional groups is ordinarily and conveniently accomplished by hydrolysis with acid or base, such that the various functional groups described above in relation to the melt-fabricable polymers are converted respectively to the free acids or the sodium salts thereof. Such hydrolysis can be carried out in an aqueous bath of either a mineral acid or sodium hydroxide. Alkaline hydrolysis is preferred as it is faster and more complete. Use of hot hydrolysis baths, such as near the boiling point of the solution, is preferred for rapid hydrolysis. The time required for hydrolysis increases with the thickness of the structure. It is advantageous to include in the hydrolysis bath a water-miscible organic compound such as, e.g., dimethyl sulfoxide, to swell the membrane and thus increase the rate of hydrolysis.

The equivalent weights of the polymers in the membrane are selected to provide a water transport of 3.0–4.0 moles water per mole Na, assuming a hydrogen-evolving cathode is used, as is customary. If an oxygen-consuming cathode is used, the water transport is 2.0–3.0 moles water per mole Na. The equivalent weight required for this water transport depends on the structure of the acid-containing side chain on each polymer. In the case where the carboxyl side chains are $-OCF_2-CF(CF_3)-O-CF_2-CF_2-COOH$, that is, where Y in the formula of the comonomer Z is trifluoromethyl and n=1, the equivalent weight of the nonporous layer in contact with the catholyte should be about 1170–1230. In the case where the carboxyl side chains are $-OCF_2-CF_2COOH$ (n=0), the corresponding equivalent weight should be about 1000–1065, while in the case where the carboxyl side chains are $-[O-CF_2-CF(CF_3)]_2-OCF_2-CF_2COOH$ (Y is trifluoromethyl and n=2), the corresponding equivalent weight should be about 1330–1395.

The equivalent weight of the sulfonate polymer is much less critical. It should be low enough to give low membrane resistance or low electrolysis voltage, but not so low as to give a membrane which is too soft or sticky when wet for convenient handling and installation in a cell. In the case where the side chain is $-O-CF_2-CF(CF_3)-O-CF_2-CF_2-SO_3H$ or its salt, the equivalent weight should be 800–1500, preferably 900–1300, and most preferably 1000–1200. Optionally, the sulfonic acid layer may have an equivalent weight lower than that of the adjacent carboxyl layer.

The membrane may be unreinforced, but for dimensional stability and greater notched tear resistance, it is common to use a reinforcing material. It is customary to use a fabric made of a fluorocarbon resin such as polytetrafluoroethylene or a melt-processable copolymer of tetrafluoroethylene with hexafluoropropylene or with perfluoro(propyl vinyl ether). These may be woven into fabric using various weaves, such as the plain weave, basket weave, leno weave, or others. Relatively open weaves are preferred because the electric resistance is lower. A porous sheet may be used as a support. Other perhalogenated polymers such as polychlorotrifluoroethylene may also be used, but perfluorinated supports have the best resistance to heat and chemicals. The fibers used in the support fabrics may be monofilaments or multifilament yarns. They may be of ordinary round cross-section or may have specialized cross-sections. Oblong or rectangular cross-sections, if suitably oriented to the membrane, make it possible to get more reinforcing action with a thinner overall membrane. It may be desirable to use sacrificial fibers such as rayon, paper, or polyester, along with the fluorocarbon fibers, as described in U.S. Pat. No. 4,437,951 (Bissot et al., Du Pont). Care should be taken, however, not to have the soluble or degradable fibers extend from one surface to the other lest the nonporous membrane become a porous diaphragm, and the caustic product contain too much salt. Even with a cloth or mesh of fluorocarbon fibers, it is preferred not to have the cloth penetrate the surface of the membrane on the cathode side. The fabric employed may be calendered before lamination to reduce its thickness. In a bimembrane, the fabric may be in the sulfonate or carboxylate layer, or in both, but is more often in the sulfonate layer, which is usually thicker. In place of fabric, fibrils can be used.

The membrane or bimembrane may be used flat in various known filter press cells, or may be shaped around an electrode. The latter is especially useful when it is desired to convert an existing diaphragm cell to a membrane cell in order to make higher quality caustic.

Membranes can be swelled with polar solvents (such as lower alcohols or esters, tetrahydrofuran, or chloroform) and then dried, preferably between flat plates, to improve their electrolytic performance. Before mounting in commercial cell support frames, which may be 1–5 meters on a side, the membrane can be swelled so that it will not wrinkle after it is clamped in the frame and exposed to electrolytic fluids. Among the swelling agents that can be used are water, brine, caustic, lower alcohols, glycols, or mixtures thereof. See, for example, U.S. Pat. No. 4,595,476 (Bissot, Du Pont).

The cell can have two or three compartments, or even more. If three or more compartments are used, the membrane is commonly placed next to the cathode compartment, and the other dividers may be porous diaphragms or membranes based on polymers having pendant side chains with terminal $-CF_2-SO_3Na$ groups only. The cells may be connected in series (so-called bipolar cells) or in parallel (so-called monopolar cells).

The membrane may be disposed horizontally or vertically in the cell, or at any angle from the vertical.

Any of the conventional electrodes or electrode configurations may be used. The anode should be resistant to corrosion by brine and chlorine and to erosion and preferably should contain an electrocatalyst to minimize chlorine overvoltage. A commercially available anode known as dimensionally stable anode (or DSA) is one of those that are suitable. A suitable base metal is titanium, and the electrocatalysts include reduced platinum group metal oxides (such as Ru and the like), singly or in mixtures, optionally admixed with a reduced oxide of Ti, Ta, Cb, Zr, Hf, V, Pt, or Ir. The electrocatalysts may be heat-treated for stability.

The anode may be a "zero-gap" anode, against which the membrane is urged and which anode is permeable to both liquids and gases. The anode may be kept a small distance from the membrane by the use of a spacer, against which the membrane is urged by a small hydraulic head on the other side of the membrane. The spacer may be made of a plastic which is resistant to the chemicals in the anolyte, such as polytetrafluoroethylene, ethylene/tetrafluoroethylene copolymer, or polychlorotrifluoroethylene. It is desirable that the spacer or the electrode have open vertical channels or grooves to facilitate the escape of gas evolved at the anode. Whether or not there is a spacer, it may be desirable to have the anode openings slanted, so that the gas is carried away from the membrane, and anolyte circulation past the membrane is maximized. This effect can be augmented by using downcomers for anolyte which has been lifted by the rising gas bubbles. The anode may be a screen or perforated plate or powder which is partially embedded in the anode surface layer of the bimembrane. In this case, the current may be supplied to the anode by current distributors which contact the anode at numerous closely-spaced points. The anode may be a porous catalytic anode attached to or pressed against the membrane or attached to or pressed against a porous layer, which is in turn attached to or pressed against the membrane.

The cathode should be resistant to corrosion by the catholyte, resistant to erosion, and preferably will contain an electrocatalyst to minimize hydrogen overvoltage. The cathode may be, e.g., mild steel, nickel, or stainless steel, and the electrocatalyst may be platinum black, palladium, gold, spinels, manganese, cobalt, nickel, Raney nickel, reduced platinum group metal oxides, alpha-iron and the like.

The cathode may be a "zero-gap" cathode, against which the membrane is urged and which cathode is permeable to both liquids and gases. The cathode may be kept a small distance from the membrane by the use of a spacer, against which the membrane is urged by a small hydraulic head on the other side of the membrane. In the case of a three-compartment cell, both membranes may be urged against electrodes or spacers by a hydraulic head on the center compartment. The spacer may be made of a plastic which is resistant to the chemicals in the catholyte, such as polytetrafluoroethylene, ethylene/tetrafluoroethylene resin, or polychlorotrifluoroethylene. It is desirable that the cathode spacer or electrode have open vertical channels or grooves to facilitate the escape of gas evolved at the cathode. Whether or not there is a spacer, it may be desirable to have the cathode openings slanted so the gas is carried away from the membrane and catholyte flow past the membrane is maximized. This effect may be augmented by using downcomers for catholyte which has been lifted by rising gas bubbles. The cathode may be a porous cathode, pressed against the membrane or pressed against a porous layer, which is in turn attached to or pressed against the membrane.

An oxygen cathode can be used, in which oxygen is supplied to the cathode and substantially no hydrogen is evolved, with lower cell voltage as a result. The oxygen may be supplied either by bubbling through the catholyte and against the cathode, or by feedin oxygen-containing gas through a porous inlet tube which also serves as cathode and is coated with electrocatalyst.

It has long been known that it is desirable in the electrolysis of brine to use sodium chloride of low Ca and Mg content. It is also well known how to remove hardness from sodium chloride solutions to very low levels. Heavy metals like iron and mercury and foreign anions such as iodide should also be substantially removed. Some of the contaminants in make-up brine can be removed by passing the brine through a diaphragm cell before it is fed to the membrane cell system. Further hardness reductions can be achieved by passing the brine through a chelate ion exchanger, preferably one containing $-NHCH_2COOH$ groups, or a phosphate may be added to the brine to precipitate insoluble salts.

Brine fed to the cell is usually close to its saturation concentration, which is about 26% by weight both at room temperature and at about 80° C., but a slightly lower brine concentration is acceptable. Brine concentrations in the anolyte compartment are measured on exit brine. By the time the brine concentration is measured by hydrometer, the brine has usually cooled to close to room temperature. Exit brine concentration may be as low as about 18% or 204 g/l if it is desired to make 42% caustic, but must be much higher, preferably 25% or 297 g/l, if it is desired to make 54% caustic. The usual way to control brine concentration is to control brine feed rate, which causes the anolyte to overflow to resaturation equipment.

While this process makes concentrated caustic, it should be started up at more conventional conditions. First, the membrane is converted to the Na salt form by treatment with an aqueous solution of about 2% sodium hydroxide or sodium bicarbonate and is installed in the cell. The cell is charged with caustic at less than 35% NaOH concentration, preferably less than 30%, and with 15–26% brine, preferably about 18%, with pH equal to or greater than 2. The electrolyzer is heated to 65°–90° C., and flow of current is started gradually, so that the cell voltage does not exceed 4.0 V. Flow of saturated brine to the anolyte and water to the catholyte is started, and the operation is stabilized at 25–35% caustic, preferably 30–32%, for one to two days. Water feed to the catholyte is then stopped, and the concentration of exit brine is controlled at about 18%, to gradually bring the caustic concentration to about 42%. Higher caustic concentration can be achieved by increasing the exit brine concentration.

Because a bimembrane or multi-layer membrane containing one or more sulfonyl layers has lower electrical resistance than an all-carboxylate membrane, it can be operated at lower voltage or higher current density. Good results can be obtained at 2–5 kA/m$^2$, preferably 3–4 kA/m$^2$.

It is desirable to acidify the anolyte to minimize the formation of oxygen and chlorate at the anode. Overacidification is not as serious an error in the case of a carboxyl/sulfonyl bimembrane as in the case of an all-carboxylate membrane, because the $-CF_2SO_3H$ group is a stronger acid than the $-CF_2COOH$ group, and the sulfonate form, $-CF_2SO_3-$, resists conversion to the acid form by overacidification more strongly than does the carboxylate ion form. The free acids are to be avoided because they increase membrane voltage.

Anolyte acidity is normally adjusted to a pH value in the range of 1–5 by addition of hydrochloric acid or hydrogen chloride to the recycle brine. Recycle brine may be concentrated by addition of solid salt and/or by evaporating or distilling water from the stream.

While membrane cells are frequently operated at approximately atmospheric pressure, there can be advantages to operating them at elevated pressure. While direct current is ordinarily used in membrane cells, one can also use pulsed direct current or half-wave alternating current or rectified alternating current or direct current with a square wave.

Brine electrolysis is normally carried out at a temperature of about 70°–110° C., preferably 80°–100° C. At temperatures above about 100° C., pressure cells should be used.

The membrane used in this invention should have a porous catholyte diffusion layer on the catholyte surface. This layer may be a porous membrane coating or an adjacent layer of asbestos paper. The asbestos paper should be 4–20 mils (102–508 micrometers) thick, preferably 6–10 mils (152–254 micrometers).

Preferably, the catholyte diffusion layer is a gas- and liquid-permeable porous non-electrode layer. Such non-electrode layer can be in the form of a thin hydrophilic coating or spacer and is ordinarily of an inert electroinactive or non-electrocatalytic substance. Such non-electrode layer should have a porosity of 10 to 99%, preferably 30 to 70%, and an average pore diameter of 0.01 to 2000 micrometers, preferably 0.1 to 1000 micrometers, and a thickness generally in the range of 0.1 to 500 micrometers, preferably 1 to 300 micrometers. A non-electrode layer ordinarily comprises an inorganic component and a binder; the inorganic component can be an inorganic compound which is chemically stable in hot concentrated caustic and chlorine, and can be of a type as set forth in U.S. Pat. No. 4,661,218 (Oda et al., Asahi Glass), preferably tin oxide, titanium oxide, silicon carbide, or zirconium oxide. The particle size of the inorganic material can be about 1–100 micrometers, and preferably 1–10 micrometers.

The coating density should be 1–10 g of coating per square meter of membrane, preferably 2–6 g/m$^2$.

The binder component in the non-electrode layer can be, for example, polytetrafluoroethylene, a fluorocarbon polymer at least the surface of which is hydrophilic by virtue of treatment with ionizing radiation in air, or a modifying agent to introduce functional groups such as —COOH or —SO$_3$H (as described in U.S. Pat. No. 4,287,032 (Pellegri, Oronzio de Nora) or treatment with an agent such as sodium in liquid ammonia, a functionally substituted fluorocarbon polymer or copolymer which has carboxylate or sulfonate functional groups, or polytetrafluoroethylene particles modified on their surfaces with fluorinated copolymers having acid type functional groups (U.S. Pat. No. 4,661,218, Oda et al., Asahi Glass). Such binder can be used in an amount of about from 10 to 50% by wt. of the non-electrode layer. In addition to the inorganic component and the binder, the dispersion used to apply the inorganic component can include a thickener such as methyl cellulose or polyvinyl alcohol and a small amount of nonionic surfactant.

Composite structures having non-electrode layers thereon can be made by various techniques known in the art, which include preparation of a decal which is then pressed onto the membrane surface, spray application of a slurry in a liquid composition (for example, dispersion or solution) of the binder followed by drying, screen or gravure printing of compositions in paste form, hot pressing of powders distributed on the membrane surface, and other methods disclosed in the art. Such structures can be made by applying the indicated layers onto membranes in melt-fabricable form, and by some of the methods onto membranes in ion-exchange form; the polymeric component of the resulting structures when in melt-fabricable form can be hydrolyzed in known manner to the ion-exchange form.

It is not clear why a porous catholyte diffusion layer is helpful in a membrane process for making concentrated caustic. Without being bound by any hypothesis, it is possible to present one possible reason why such a layer is helpful. Modern chloralkali membranes designed to produce concentrated caustic have a nonuniform water content under cell operating conditions. The concentrated caustic in the cathode chamber is a strong dehydrating agent and draws water out of the membrane surface with which it is in contact. The water associated with the sodium ions transported through an operating membrane keeps the bulk of the membrane thickness in a hydrated state. The combination of these effects produces a dehydrated layer or skin on the cathode face of the membrane which has a low water content while the remainder of the membrane cross-section has a substantially higher water content. This dehydrated cathode skin provides the high hydroxyl ion rejection obtainable in modern chloralkali membranes which results in current efficiencies of up to 96–97%. The remainder of the membrane thickness provides the necessary mechanical strength, yet because it has a higher water content it contributes less to the voltage drop across the membrane.

When a porous catholyte diffusion layer, consisting of hydrophilic, yet non-conducting particles bonded to the cathode face of the membrane is provided, it increases the thickness of the diffusion layer at this surface, thereby reducing the extent of cathode surface dehydration as a function of caustic concentration. The water content of the cathode skin layer then becomes somewhat more dependent on the water transport rate through the membrane and less dependent on the actual caustic concentration of the cathode chamber. Thus cathode surface coatings can significantly extend to both higher and lower caustic concentration ranges the capability to obtain high current efficiency in a membrane cell.

On the anolyte side, the membrane may have a bubble release coating. This may be a non-electrode coating as described above, and suitably may be $ZrO_2$. Another way to provide this gas-release coating is to provide optimum surface roughness or smoothness by hot roll embossing or by embossing with a porous paper. When embossing with a porous paper, a release paper can be applied to an outer surface of the membrane prior to passing through a laminator used, for example, to incorporate a reinforcement in the membrane. Such surface embossing is further described in U.S. Pat. No. 4,349,422 (Maloney, Du Pont). Preferably, the resulting surface roughness is about 2–5 micrometers as measured, for example, with a Bendix Model 1020 profilometer.

Membranes which carry thereon one or more nonelectrode layers can be employed in an electrochemical cell in a narrow-gap or zero-gap configuration as described above.

By use of the process of the present invention, it has been possible to make in a sustained manner concentrated 42–43% caustic with a current efficiency of 93–97% and 44–46% caustic with a current efficiency of 93-96%. Some of these experiments ran for nearly a year. Because of these excellent results, it was possible to make 48-50% caustic from the initially formed 44-46% caustic by evaporation of the catholyte using the sensible heat of the solution, without the application of additional heat energy. This result is quite surprising in view of the repeated statements in both the patent and technical literature to the effect that carboxylic membranes are unstable at high caustic concentrations and elevated temperatures.

The process of this invention has additional surprising advantages. Thus, the cells using this process are tolerant of upsets in caustic concentration, which may occur when brine flow to the anolyte chamber is interrupted. Furthermore, under continuous process conditions, the caustic concentration is automatically controlled by controlling the concentration of the brine in the anolyte. In addition, the process of this invention is surprisingly resistant to deterioration of performance in the presence of small amounts of calcium ions, which is well known to be a problem with cation exchange membranes, especially those containing carboxyl groups.

Finally, the process of this invention gives current efficiency that is close to constant over a wide range of caustic concentrations.

This invention is now illustrated by certain representative embodiments thereof, where all sodium hydroxide concentrations are by weight.

The following abbreviations are used in the examples:

TFE is $CF_2=CF_2$

EVE is $CF_2=CFOCF_2CF(CF_3)OCF_2CF_2COOCH_3$

PSEPVE is $CF_2=CFOCF_2CF(CF_3)OCF_2CF_2SO_2F$

Vcell is cell voltage

CE is caustic current efficiency, calculated as the amount of caustic actually made as a percentage of that theoretically capable of being produced by the current flowing through the electrolytic cell.

DSA is dimensionally stable anode

EXAMPLE 1

A small laboratory chloralkali test cell having electrode active area of 45 cm² was assembled with the following components:

A. A DSA anode made from a $RuO_2$, $TiO_2$ coating on flattened titanium expanded metal mesh.

B. A non-reinforced perfluorinated ion exchange membrane comprised of a cathode surface layer of 1.0 mil (25 micrometers) of a hydrolyzed TFE/EVE copolymer having an equivalent weight of 1200 and an anode surface layer consisting of 3.1 mils (79 micrometers) of a hydrolyzed TFE/PSEPVE copolymer having an equivalent weight of 1080. The cathode and anode surfaces of the membrane were coated with a thin layer of $ZrO_2$ particles bonded to the surface with an alcohol solution of hydrolyzed TFE/PSEPVE copolymer having an equivalent weight of 950. The membrane was installed in contact with the anode.

C. A mild steel cathode made of flattened expanded metal mesh.

The cell was operated at 90° C. with a current density of 3.1 kA/m². The anolyte exit salt concentration was controlled from 200 g/l to 240 g/l with addition of saturated purified ($Ca^{++}$ less than 50 ppb) brine.

The caustic concentration was varied to generate a current efficiency profile. Current efficiency was essentially constant from 32% NaOH to 41% NaOH. This is to be contrasted with an uncoated membrane which shows a maximum in current efficiency at 32-38% NaOH and declines with increasing caustic concentration (Comparative Example A).

Figure 1:
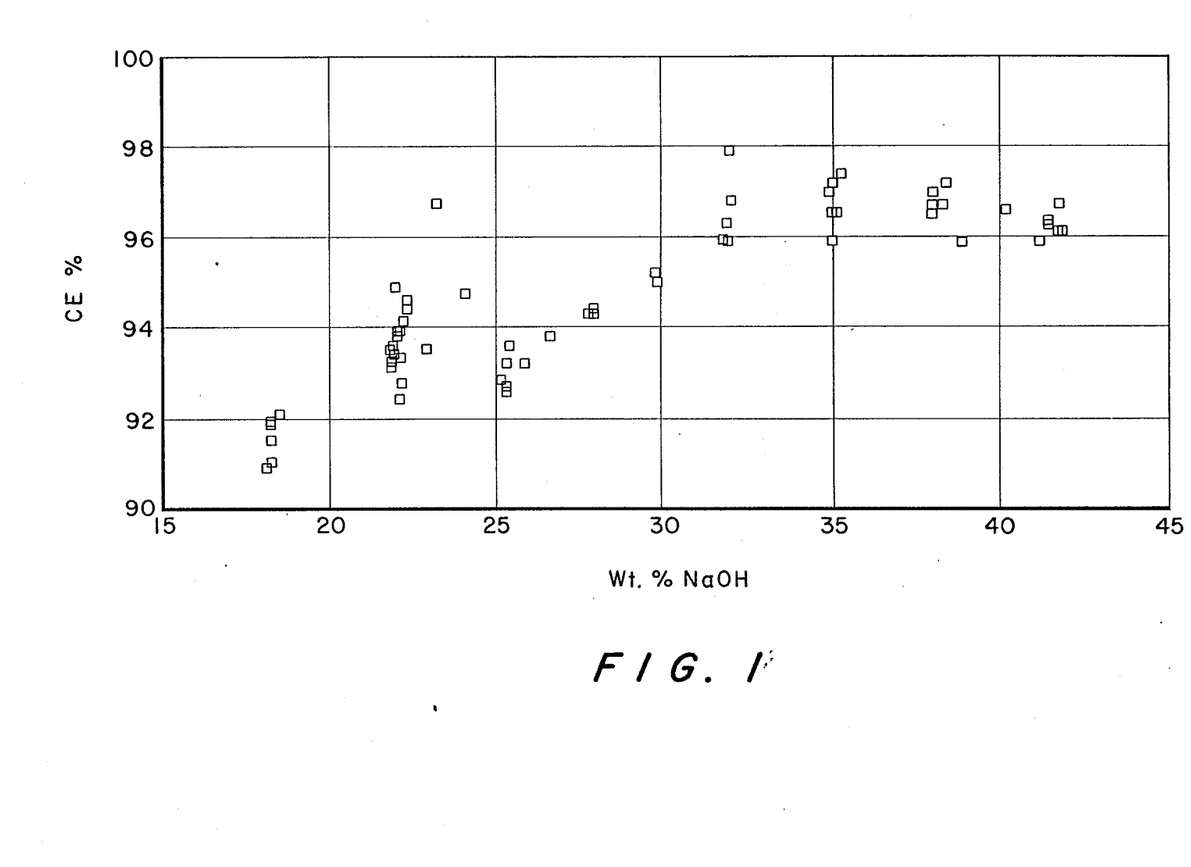
FIGS. 1, 2, and 8 are plots of current efficiency vs. NaOH concentration.

The results are presented in the following table and FIG. 1.

| Avg. NaOH (%) | Avg. C.E. (%) | Avg. Vcell (volts) | Day on Line |
|---|---|---|---|
| 22.1 | 93.7 | 3.32 | 7 to 20 |
| 18.3 | 91.4 | 3.35 | 28 to 34 |
| 25.3 | 92.9 | 3.42 | 36 to 42 |
| 28.5 | 94.5 | 3.41 | 48 to 54 |
| 31.9 | 96.5 | 3.47 | 55 to 62 |
| 35.1 | 96.7 | 3.53 | 63 to 70 |
| 38.3 | 96.6 | 3.61 | 71 to 79 |
| 41.4 | 96.2 | 3.68 | 82 to 90 |
| 22.2 | 92.8 | 3.35 | 93 to 98 |

This example shows that the same membrane is capable of making caustic of any concentration from 22-42% at high current efficiency, capable of operating at 22% caustic after operating at 41% caustic, and capable of operating for 98 days on line before it was voluntarily shut down.

EXAMPLE 2

Figure 2:
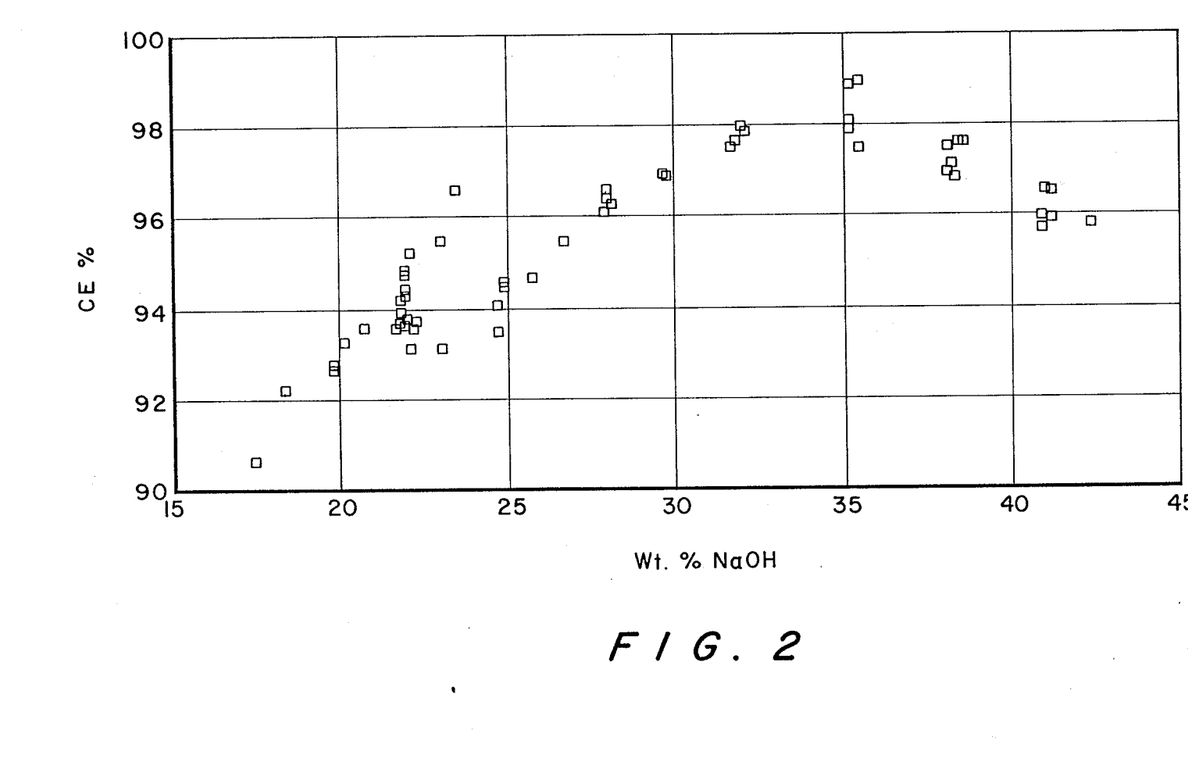

Example 1 was repeated with minor differences in caustic concentrations. The following table and FIG. 2 summarize performance.

| Avg. NaOH (%) | Avg. C.E. (%) | Avg. Vcell (volts) | Day on Line |
|---|---|---|---|
| 21.9 | 94.2 | 3.40 | 3 to 21 |
| 20.2 | 93.0 | 3.42 | 22 to 25 |
| 24.8 | 94.1 | 3.49 | 31 to 37 |
| 28.6 | 96.4 | 3.54 | 43 to 49 |
| 31.9 | 97.6 | 3.60 | 50 to 57 |
| 35.3 | 98.1 | 3.66 | 58 to 65 |
| 38.3 | 97.2 | 3.71 | 66 to 74 |
| 41.0 | 95.9 | 3.77 | 77 to 80 |
| 22.2 | 93.4 | 3.46 | 87 to 93 |

This example is very similar to Example 1, except the current efficiency is higher but not quite as constant between 32 and 42% caustic.

EXAMPLE 3

A small laboratory chloralkali test cell having an electrode active area of 45 cm² was assembled with the following components:

A. A DSA anode made from a $RuO_2$, $TiO_2$ coating on flattened titanium expanded metal mesh.

B. A reinforced perfluorinated ion exchange membrane comprising a cathode surface layer of 1.0 mil (25 micrometers) of a hydrolyzed TFE/EVE copolymer having an equivalent weight of 1200 bonded to a 3.0 mil (76 microns) layer of a hydrolyzed TFE/PSEPVE copolymer having an equivalent weight of 1080. A reinforcing fabric consisting of a calendered plain weave of 200 denier ($2.22 \times 10^{-5}$ kg/m) PTFE filament and 40 denier ($4.44 \times 10^{-6}$ kg/m) multifilament polyester was employed. The fabric is described by 8 PTFE filaments per 2.5 cm and 8 polyester multifilaments between each pair of PTFE filaments. The fabric was intimately bonded between the 4.0 mils (102 micrometers) section and a 1.0 mil (25 micrometers) layer of hydrolyzed TFE/PSEPVE copolymer having an equivalent weight of 1080. The anode surface of the membrane was melt pressed against silicone treated paper to provide a roughened surface. The TFE/EVE side of the membrane was coated with a thin layer of $ZrO_2$ particles bonded to the surface with an alcohol solution of TFE/PSEPVE copolymer having an equivalent weight of 950. The membrane was installed with the TFE/PSEPVE side in direct contact with the anode.

C. A low hydrogen-overvoltage cathode made from a platinized 20 mesh nickel screen supported on flattened nickel expanded metal mesh. The cathode was installed in direct contact with the $ZrO_2$ coated TFE/EVE side of the membrane.

The cell was operated under conditions similar to Example 1. Initially, the caustic concentration was cycled between more than 40% NaOH and 20-35% NaOH to determine the effect on current efficiency (CE). The CE at high NaOH concentration was more than 94% and after cycling was restored at more than 94% CE at more than 40% NaOH. This is atypical of coated membranes having TFE/EVE equivalent weights of 1050, which show irreversible declines in CE with cycling to NaOH concentrations more than 40%.

Figure 3:
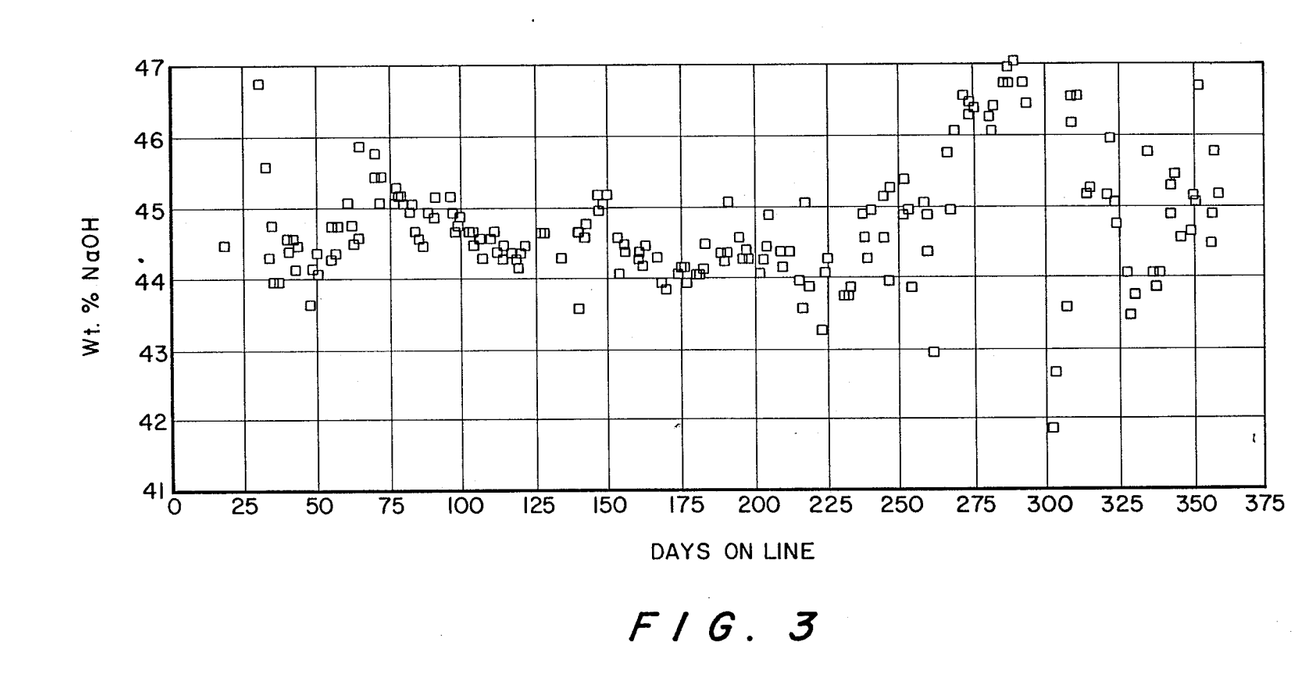
FIGS. 3 and 7 are plots of NaOH concentration vs. days on line, according to the present invention.
Figure 4:
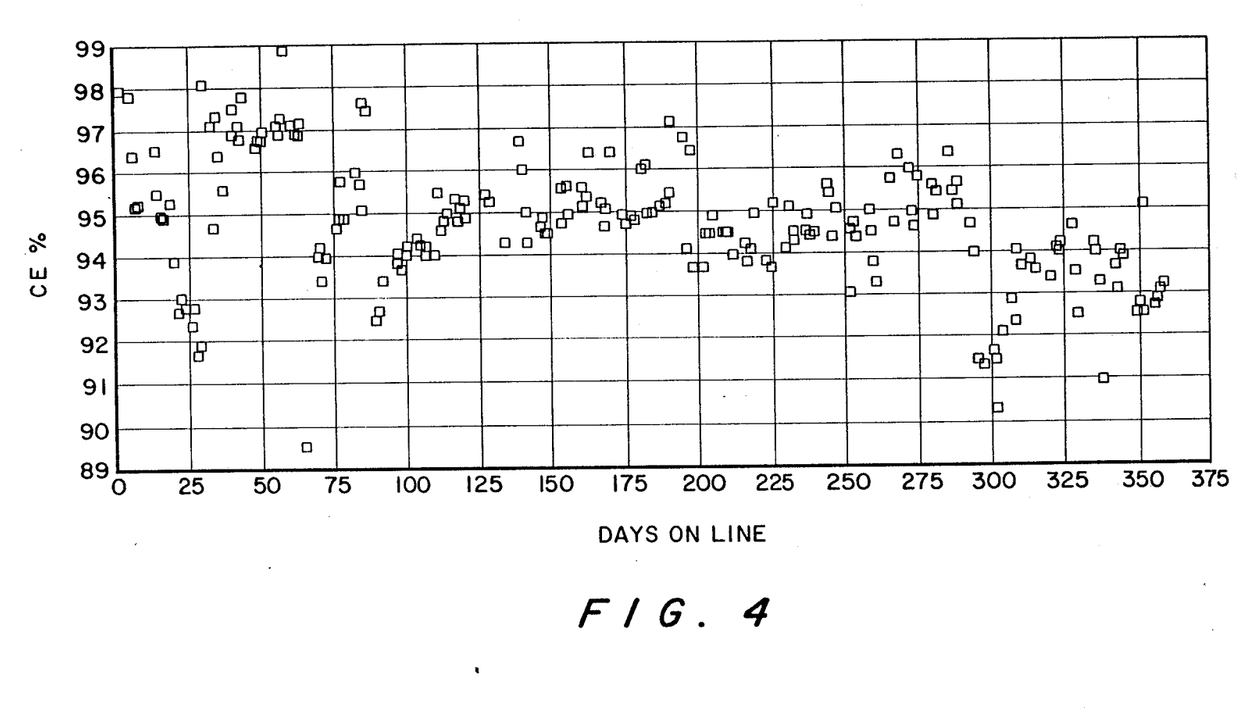
FIGS. 4 and 6 are plots of current efficiency vs. days on line, according to the present invention.
Figure 5:
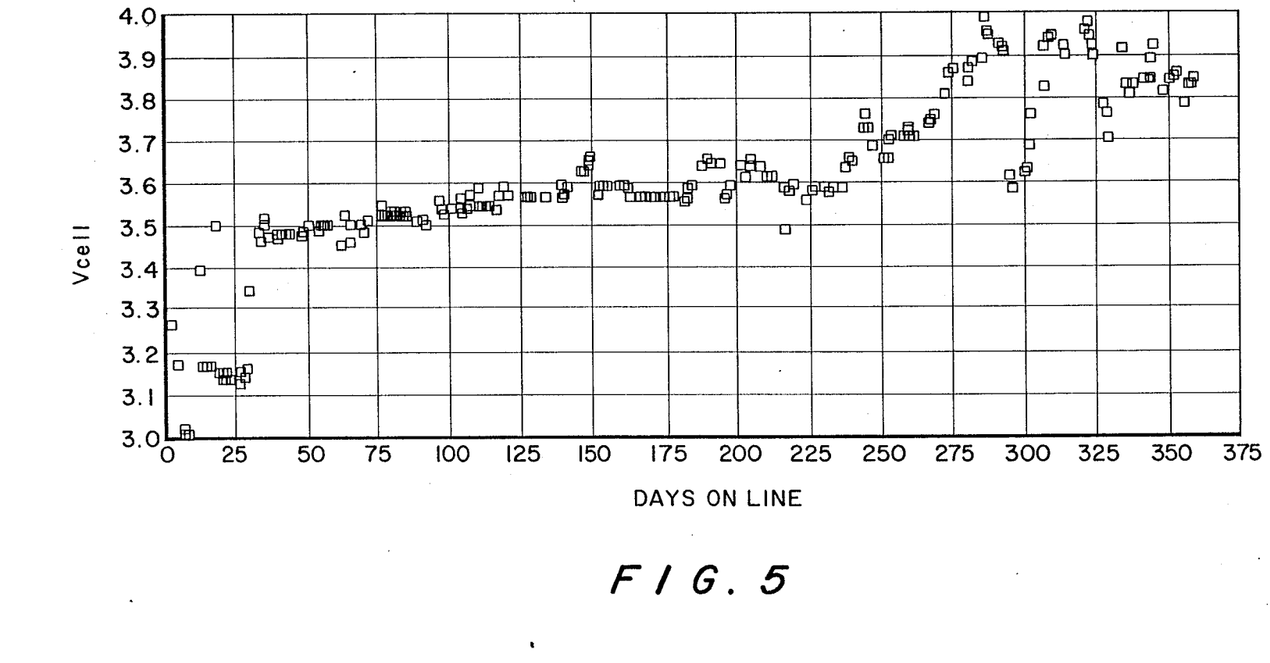
FIG. 5 is a plot of cell voltage vs. days on line, according to the present invention.

The membrane has operated for over 300 days at 93-96% CE and 3.5-3.6 volts. FIGS. 3-5 summarize its performance, showing that the cell operated for about a year at 42-47% caustic, mostly 44-45%, maintaining good current efficiencies, most daily figures being in the range of 93-96%. Cell voltage started at an attractive figure of 3.5 V, but after 230 days the voltage exceeded 3.6 V.

This example shows that concentrated caustic can be made for a long time without serious deterioration of current efficiency. It also shows that the process can be cycled between 20 and 40% caustic without permanent deterioration in current efficiency.

EXAMPLE 4

Example 3 was repeated using a mild steel cathode made of flattened expanded metal mesh. The TFE/EVE side of the membrane was not contacted with the steel cathode during operation.

Figure 6:
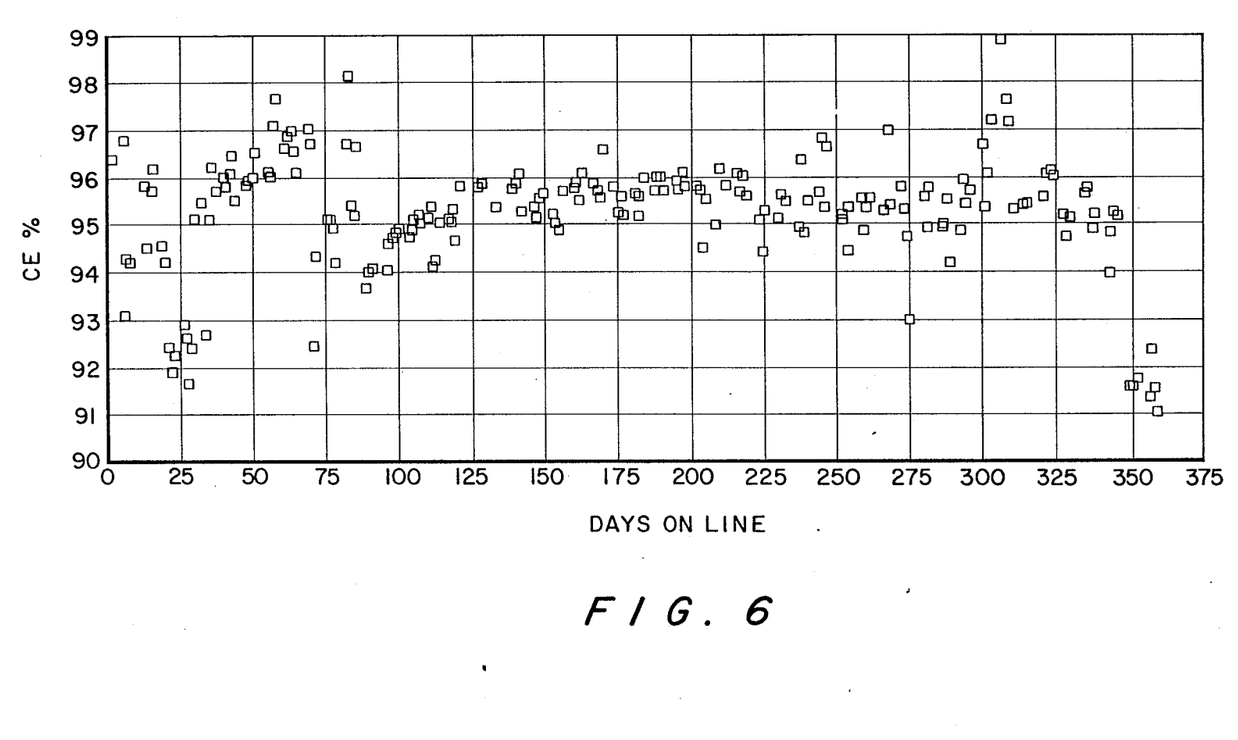
Figure 7:
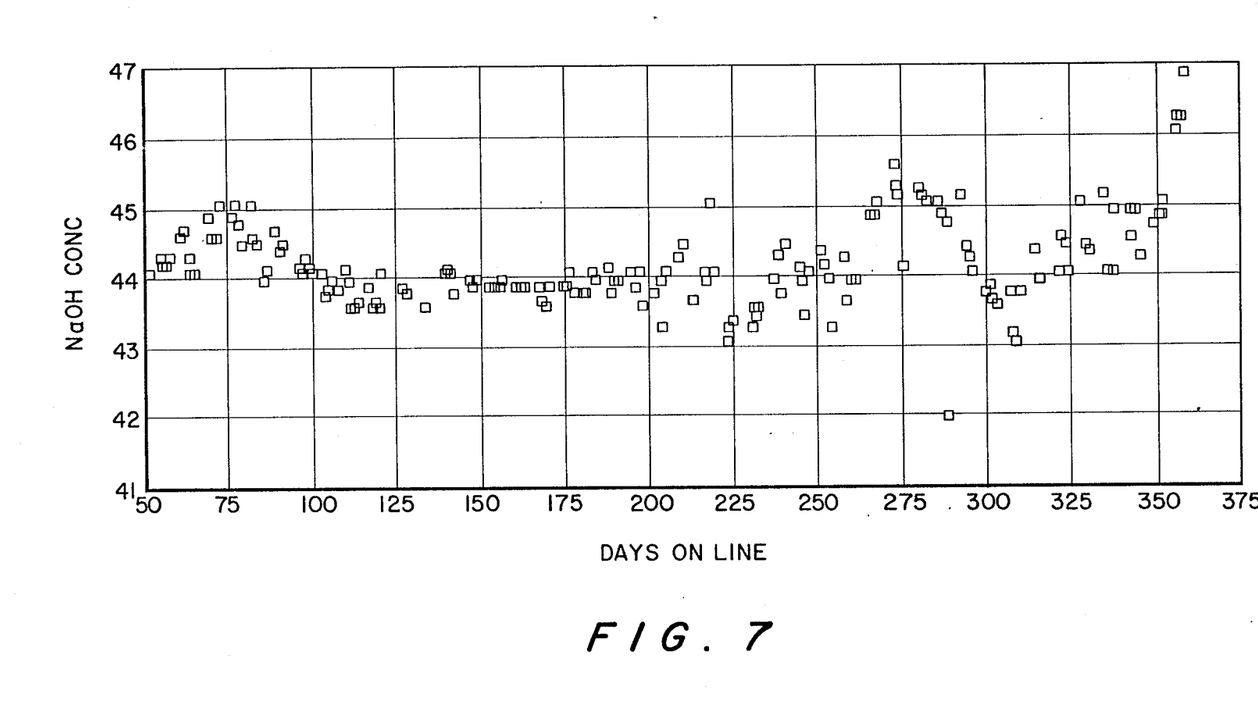

The results were very similar to those in Example 3 with long-term (more than 300 days, operation) performance of 94-97% CE and 3.8-4.0 volts. FIGS. 6 and 7 summarize performance at 44-45.5% caustic, with occasional excursions as low as 42% or as high as 47%. Voltage was mostly 3.9-4.0 V.

COMPARATIVE EXAMPLE A

Example 4 was repeated except the membrane was uncoated. The current efficiency was 95-97% at 32-38% caustic. However, because the membrane was uncoated the current efficiency declined to 91-94% at 42-48% caustic. This contrasts with Example 1 and with Example 4 (coated membranes). In Example 4 current efficiency remained flat at about 95-96% at 44-45.5% caustic, with excursions to 42 or 47% caustic.

EXAMPLE 5

The membrane used had 1 mil (25 micrometers) of a hydrolyzed TFE/EVE copolymer having an equivalent weight of 1200 on the cathode side and an anode surface layer of 3 mils (76 micrometers) of a hydrolyzed TFE/PSEPVE copolymer having an equivalent weight of 1080. The membrane was reinforced with a calendered plain weave fabric containing both reinforcing and sacrificial threads. The reinforcing threads were 200 denier ($22.22 \times 10^{-6}$ kg/m) monofilaments of polytetrafluoroethylene 19 micrometers thick and 508 micrometers wide, twisted 10 twists per inch (4 per centimeter) and flattened, with a warp and weft count of 8 threads/inch (3.1 threads/cm). Each twisted thread was about 4 times as wide as it was thick. The sacrificial threads were 40 denier ($4.44 \times 10^{-6}$ kg/m) polyethylene terephthalate with a warp and weft count of 64 threads/inch (25 threads/cm). A $ZrO_2$ layer was deposited on the cathode side as in Example 1. The anode was DSA and the cathode was a platinized nickel screen supported by a solid nickel current distributor. The cell was operated as a zero gap cell at 90° C. at 3.1 kA/m².

Results are presented in the following table.

| Caustic Conc. (%) | Current Efficiency (%) | Days on Line | Remarks |
|---|---|---|---|
| 41-46 | 91-95 | 5-15 | |
| 42-46 | 65-90 | 16-19 | low brine concentration |
| 46-47 | 91-92 | 20-24 | |
| 22-23 | 91-93 | 25-27 | regasketed |
| 44-49 | 88-94 | 36-96 | |
| 31-32 | 88-89 | 97-101 | |
| 43-48 | 88-90 | 102-109 | |
| 48-54 | 90-93 | 110-138 | |
| 21-10+ | 86-92 | 139-147 | |
| 9-5+ | 91-94 | 148-163 | |
| 30-33 | 79-82 | 164-169 | never recovered high current efficiency; shut down. |

This example shows that good current efficiency can be achieved up to 54% caustic; that a low-brine-concentration upset need not permanently damage the membrane; that the cell recovered after regasketing; that the performance was not damaged by changing from about 46% caustic to either 22% caustic or 31% caustic and then returning to about 46% caustic; that the process provides long life; and that operation at 5-9% caustic concentration after operating at about 50% caustic does prevent good cell performance when caustic concentration is increased to a more normal range.

EXAMPLE 6

This example shows that a membrane with an equivalent weight of the carboxyl layer in the most preferred range and with a porous catholyte diffusion layer on the catholyte side is tolerant of Ca concentrations in the brine which are not tolerated by various other membranes.

A membrane with 1200 equivalent weight TFE/EVE copolymer on the cathode side, coated with $ZrO_2$, was operated in a chloralkali cell that was fed with brine containing 1 ppm calcium ion, an unusually high concentration. The cell was operated for 152 days at 32% caustic and maintained a caustic current efficiency of greater than 96%.

For comparison, a similar membrane with an equivalent weight of 1050 for the cathode side carboxyl layer was operated under the same conditions with brine containing 1 ppm Ca, and the current efficiency declined to less than 90% in 10 days. Several other membranes outside the required equivalent weight range declined to 90% current efficiency in 5 to 40 days of operation with brine containing 1 ppm Ca. Some had fiber reinforcement; some did not. Some had a ZrO$_2$ coating on the cathode side; some did not. All used a carboxyl layer with equivalent weight of 1050.

COMPARATIVE EXAMPLE B

Using low-calcium brine as in Examples 1–5, membranes similar to that of Example 5 except that the carboxyl layer had an equivalent weight of 1050 gave erratic results. In one experiment with ZrO$_2$ coating on both sides of the membrane, the caustic concentration could be increased to 47.6% while the current efficiency remained high at 94.5%; but in another experiment with the membrane coated on only the carboxyl side, the current efficiency was above 96% at caustic concentrations of 32–40%, but decreased to 75% when the caustic concentration was further increased to 46% and never recovered above 88% even when the caustic concentration was gradually decreased to 32% or even 21%.

In still another experiment, using a membrane similar to the previous one, the current efficiency was about 95% at 32% caustic, but when the caustic concentration was increased to 40–42%, the current efficiency fell below 91%. It was concluded that consistently good results could not be obtained when the carboxyl layer had an equivalent weight of 1050.

COMPARATIVE EXAMPLE C

Example 1 was repeated for a non-reinforced perfluorinated ion exchange membrane comprising a cathode surface layer of 0.8 mil (20 micrometers) of a hydrolyzed TFE/EVE copolymer having an equivalent weight of 1287 and an anode surface layer consisting of 3.0 mils (76 micrometers) of a hydrolyzed TFE/P-SEPVE copolymer having an equivalent weight of 1080. The membrane was coated as in Example 1.

The membrane showed a steady decline in CE with increasing NaOH concentration above 12 wt. %. Maximum current efficiency was 95.1% at 11.5% NaOH and minimum CE was 90.9% at 37.8% NaOH. This example shows the effect of increasing equivalent weight upon cell performance.

Figure 8:
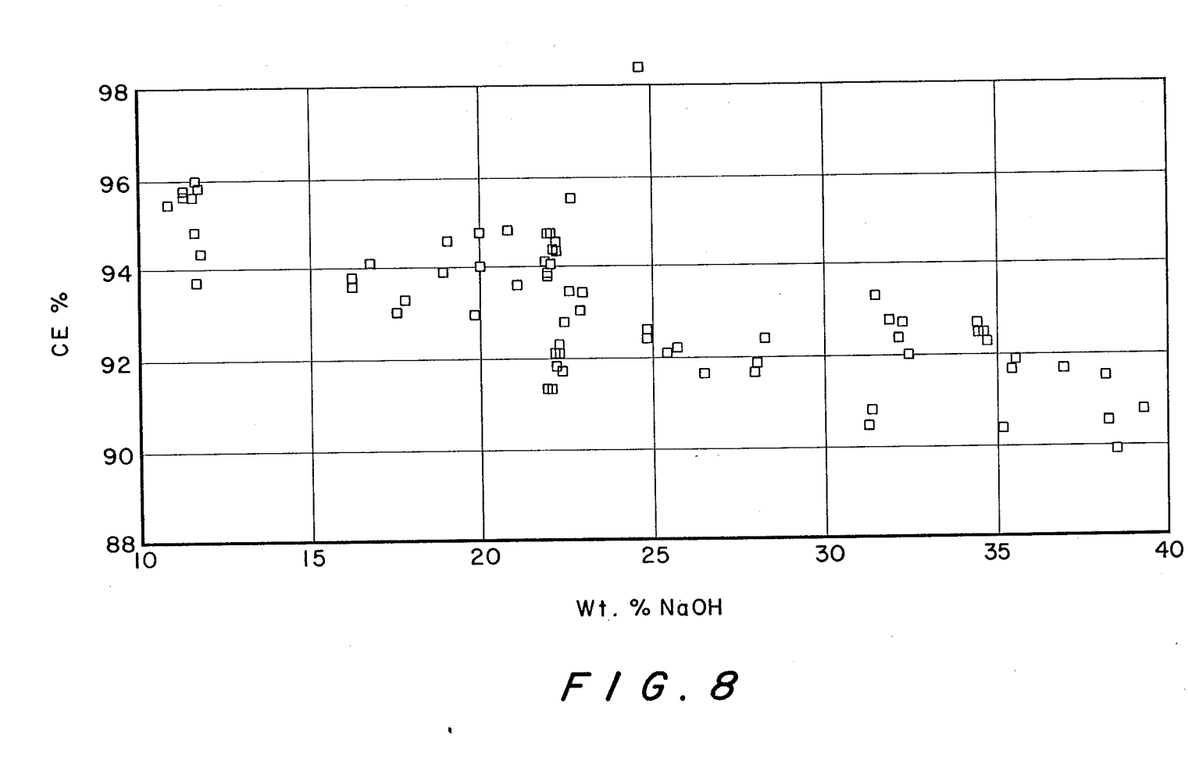

The following table and FIG. 8 summarize performance.

| Avg. NaOH (%) | Avg. C.E. (%) | Avg. Vcell (volts) | Day on Line |
|---|---|---|---|
| 22.0 | 94.1 | 3.29 | 10 to 27 |
| 20.0 | 94.3 | 3.27 | 29 to 30 |
| 19.0 | 94.2 | 3.26 | 31 to 35 |
| 25.2 | 92.2 | 3.33 | 41 to 45 |
| 28.1 | 91.8 | 3.38 | 49 to 52 |
| 31.9 | 92.0 | 3.50 | 54 to 63 |
| 34.8 | 91.9 | 3.61 | 64 to 71 |
| 37.8 | 90.9 | 3.72 | 72 to 80 |
| 22.3 | 92.0 | 3.35 | 83 to 94 |
| 17.0 | 93.5 | 3.32 | 98 to 104 |
| 11.5 | 95.1 | 3.31 | 105 to 120 |

COMPARATIVE EXAMPLE D

The membrane preferred for use in this invention also has better resistance to deterioration using sulfate-containing brine than similar membranes with a carboxyl layer having 1050 equivalent weight. A membrane like that of Example 5 was compared with identical membranes except that they had a carboxyl equivalent weight of 1050. All cells were run at 3.1 kA/m$^2$ current density for days making 32% caustic from high-quality brine deliberately contaminated with 15 g/l Na$_2$SO$_4$. The results are shown in the following table:

| Carboxyl Eq. Wt. | 1200 | 1050 | 1050 |
|---|---|---|---|
| Initial CE, % | 97.6 | 96.4 | 96.4 |
| Final CE, % | 97.2 | 94.4 | 95.2 |
| Decline in CE per day on line | 0.002 | 0.016 | 0.008 |

EXAMPLE 7

The procedure of Example 3 is repeated, except that the TFE/EVE copolymer is replaced with a TFE/CF$_2$=CFOCF$_2$CF$_2$COOCH$_3$ copolymer in which the above respective comonomers are present in a molar ratio of 7.9:1, corresponding to an equivalent weight (for the free acid) of 1032. The current efficiency is essentially constant from 32% NaOH to 40% NaOH. Cell voltages are 3.5–3.9. Current efficiencies of 93–97%, mostly 94–96%, at a caustic concentration of 44–45% are demonstrated.

After five weeks of successful operation at high caustic concentration, the caustic concentration is reduced to 22% for two days and then gradually increased to 42%, where the current efficiency is 93%.

I claim:

1. In a process for the manufacture of sodium hydroxide by electrolysis at a temperature of about 70° to 110° C. of an aqueous solution of sodium chloride in an electrolysis cell comprising an anode compartment and a cathode compartment separated from each other by a cation exchange membrane, wherein a more concentrated sodium chloride solution is continuously introduced into the anode compartment; a less concentrated sodium chloride solution is continuously withdrawn from the anode compartment; and the resulting sodium hydroxide solution is continuously recovered from the cathode compartment, wherein the improvement of operating the process in a sustained manner, tolerant of upsets in sodium hydroxide concentration, by using as the cation exchange membrane a membrane consists of at least one layer, in which the material of at least the layer closest to the cathode is a copolymer of tetrafluoroethylene with a monomer Z of the general formula wherein n is 0 or 1; and Y=F or CF$_3$; and the mole ratio of tetrafluoroethylene to monomer Z in the resin is about 7.6 to 8.2, the membrane material on the side exposed to the catholyte being itself nonporous but having a porous catholyte diffusion layer in direct contact therewith or in close proximity thereof between the membrane and the cathode, the sodium chloride concentration in the feed solution being about equal to the concentration of saturated brine at the operating temperature, and the concentration of the sodium chloride solution leaving the anode compartment being about 18-24 weight percent, no water being added to the catholyte during steady state operation, except water passing through the membrane from the anode compartment to the cathode compartment, and recovering from the cathode compartment a catholyte in which the sodium hydroxide concentration is about 42-54 weight percent.

2. A process of claim 1 wherein n in the formula of monomer Z is 1.

3. A process of claim 2 wherein Y is $CF_3$, and the equivalent weight of the nonporous layer in contact with the catholyte is about 1170-1230.

4. A process of claim 2, wherein a catholyte of a sodium hydroxide concentration of about 44-46 weight percent is obtained, and the recovered catholyte is concentrated to about 48-50 weight percent of sodium hydroxide by evaporating a portion of the water using the sensible heat of the solution.

5. A process of claim 1 wherein n in the formula of monomer Z is 0 and the equivalent weight of the nonporous layer in contact with the catholyte is about 1000-1065.

6. A process of claim 1 wherein the electrolysis temperature is 80°-100° C.

7. A process of claim 1 wherein the cation exchange membrane comprises at least one layer of a material consisting of a perhalogenated copolymer containing pendant sulfonate groups, said layer facing the anode compartment, and at least one layer of copolymer of tetrafluoroethylene with monomer Z, said layer facing the cathode compartment.

8. A process of claim 7 wherein the sulfonate group containing copolymer has pendant side chains containing the group $-CF_2CFR'SO_3Na$; $R'$ being F, Cl, $CF_2Cl$, or a $C_1$-$C_{10}$ perfluoroalkyl radical.

9. A process of claim 9 wherein the side chains have the formula $-(OCF_2CFY)_rOCF_2CFR'SO_3Na$, Y being F or $CF_3$, and r being an integer of 0 to 3.

10. A process of claim 10 wherein $R'=F$; $Y=CF_3$; and $r=1$.

11. A process of claim 1, wherein a catholyte of a sodium hydroxide concentration of about 44-46 weight percent is obtained, and the recovered catholyte is concentrated to about 48-50 weight percent sodium hydroxide by evaporating a portion of the water using the sensible heat of the solution.

12. A process of claim 11 wherein 42-43% sodium hydroxide is made at a current efficiency of about 93-97%.

13. A process of claim 11 wherein 44-46% sodium hydroxide is made at a current efficiency of about 93-96%.

14. A process of claim 1, wherein the sodium chloride concentration in the solution removed from the anode compartment is about 21-24 weight percent, and the recovered catholyte has a sodium hydroxide concentration of about 47-54 weight percent.

15. A process of claim 1 wherein 42-46% sodium hydroxide is made in a sustained manner at a current efficiency of at least 93%.

* * * * *